(12) United States Patent
Tam et al.

(10) Patent No.: US 8,188,862 B1
(45) Date of Patent: May 29, 2012

(54) REMOTE DETECTION OF COVERTLY CARRIED METAL OBJECTS

(75) Inventors: Daniel Tam, San Diego, CA (US); Jodi McGee, San Diego, CA (US); Aldo Monges, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 365 days.

(21) Appl. No.: 12/408,768

(22) Filed: Mar. 23, 2009

(51) Int. Cl.
*G08B 13/26* (2006.01)
(52) U.S. Cl. ............. 340/561; 340/573.4; 340/10.1
(58) Field of Classification Search .......... 340/561,
340/5.1, 5.2, 5.6, 5.61, 539.1, 8.1, 568.1,
340/573.4, 901, 904, 10.1, 10.5, 531, 572.7,
340/572.1, 902–903, 539.13
See application file for complete search history.

(56) References Cited

U.S. PATENT DOCUMENTS

| | | | |
|---|---|---|---|
| 4,609,866 A * | 9/1986 | Loftness | 324/551 |
| 5,512,834 A * | 4/1996 | McEwan | 324/642 |
| 6,078,292 A * | 6/2000 | Koyanagi et al. | 343/702 |
| 6,166,682 A * | 12/2000 | Kosugi et al. | 342/192 |
| 6,359,582 B1 * | 3/2002 | MacAleese et al. | 342/22 |
| 6,970,086 B2 * | 11/2005 | Nelson | 340/551 |
| 7,759,931 B2 * | 7/2010 | Tsukada et al. | 324/235 |
| 7,844,081 B2 * | 11/2010 | McMakin et al. | 382/115 |
| 2003/0034444 A1 * | 2/2003 | Chadwick et al. | 250/225 |
| 2007/0205937 A1 * | 9/2007 | Thompson et al. | 342/22 |
| 2008/0211492 A1 | 9/2008 | Tsukada et al. | |

\* cited by examiner

*Primary Examiner* — Daniel Previl
(74) *Attorney, Agent, or Firm* — Arthur K. Samora; Kyle Eppele

(57) ABSTRACT

An apparatus for remotely detecting metal objects carried by a person includes an antenna and a signal generator coupled to the antenna operable to cause the antenna to emit a first electromagnetic signal to the person at a frequency that is known to be resonant with the human body. The apparatus further includes a data capture device operable to capture response signal energy received by the antenna, the response signal energy being provided from the person in response to the first electromagnetic signal. Processing circuitry for the apparatus is operable to determine whether the response signal energy is indicative whether or not the person is carrying an appreciable amount of metal, based on reference response templates for persons that are known to be metal-free.

10 Claims, 3 Drawing Sheets

REMOTE DETECTION OF COVERTLY CARRIED METAL OBJECTS

FEDERALLY SPONSORED RESEARCH AND DEVELOPMENT

This invention (Navy Case No. 099292) is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice 619-553-5118; email ssc pac t2@navy.mil.

BACKGROUND

I. Field

This disclosure relates to systems and methods for detecting metal objects worn by individuals at a distance.

II. Background

Given the political climates of various locations around the world, soldiers, marines, law enforcement and other personnel from various security agencies are constantly faced with situations where they are confronted with suspect individuals carrying covert weapons, such as handguns and bombs. Unfortunately, in order to determine whether such suspect individuals are carrying covert weapons using conventional search techniques, it has been necessary to come into close proximity of terrorists and criminals. Such acts give rise to great risk to these personnel, as well as to innocent civilians and passers-by who happen to be nearby when the suspect individuals are searched for weapons. Accordingly, new technology related to covert weapons detection from a distance is desirable.

SUMMARY

Various aspects and embodiments of the invention are described in further detail below.

In a first series of embodiments, an apparatus for remotely detecting metal objects carried by a person includes an antenna, a signal generator coupled to the antenna operable to cause the antenna to emit a first electromagnetic signal to the person, a data capture device operable to capture response signal energy received by the antenna, the response signal energy being provided from the person in response to the first electromagnetic signal, and processing circuitry operable to determine whether the response signal energy is indicative whether or not the person is carrying an appreciable amount of metal.

In another series of embodiments, an apparatus for remotely detecting metal objects carried by a person includes an antenna, means for capturing response signal energy received by the antenna, the response signal energy being scattered from the person in response to a first electromagnetic signal making contact with the person, and processing means for determining whether the response signal energy is indicative whether or not the person is carrying an appreciable amount of metal.

In another series of embodiments, methods for remotely detecting metal objects carried by a person can include the steps of capturing response signal energy received by the antenna, the response signal energy being scattered from the person in response to a first electromagnetic signal making contact with the person, and determining whether the response signal energy is indicative whether or not the person is carrying an appreciable amount of metal.

BRIEF DESCRIPTION OF THE DRAWINGS

The features and nature of the present disclosure will become more apparent from the detailed description set forth below when taken in conjunction with the accompanying drawings, in which reference characters identify corresponding items, and in which.

DETAILED DESCRIPTION

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

The ungrounded human body acts like a lossy antenna that resonates approximately at 75 MHz. Thus, when a human body is carrying metallic objects (or when animals or the like are trained to carry metal objects), the natural resonance of the human body will interact with the natural resonant response of the metallic objects to cause the human body to resonate at a modified frequency range due to the "mutual impedance coupling phenomena", i.e., the same effect that occurs when a person standing close to a television antenna causes a change in picture quality of the television.

It will be shown that weapons detection at a distance may be accomplished by taking advantage of the mutual impedance coupling phenomena at this resonant frequency. In this manner, low power radio-frequency (RF) transmissions (which will not harm people) at a resonant frequency could be used to detect metal objects on people. The mutual impedance phenomena could be used to "boost" the return signal energy, which will further allow for remote detection of metal objects at a distance as described below. The remote detection allows the user to take action as desired to obviate the threat presented by the metal-carrying person.

Figure 1:
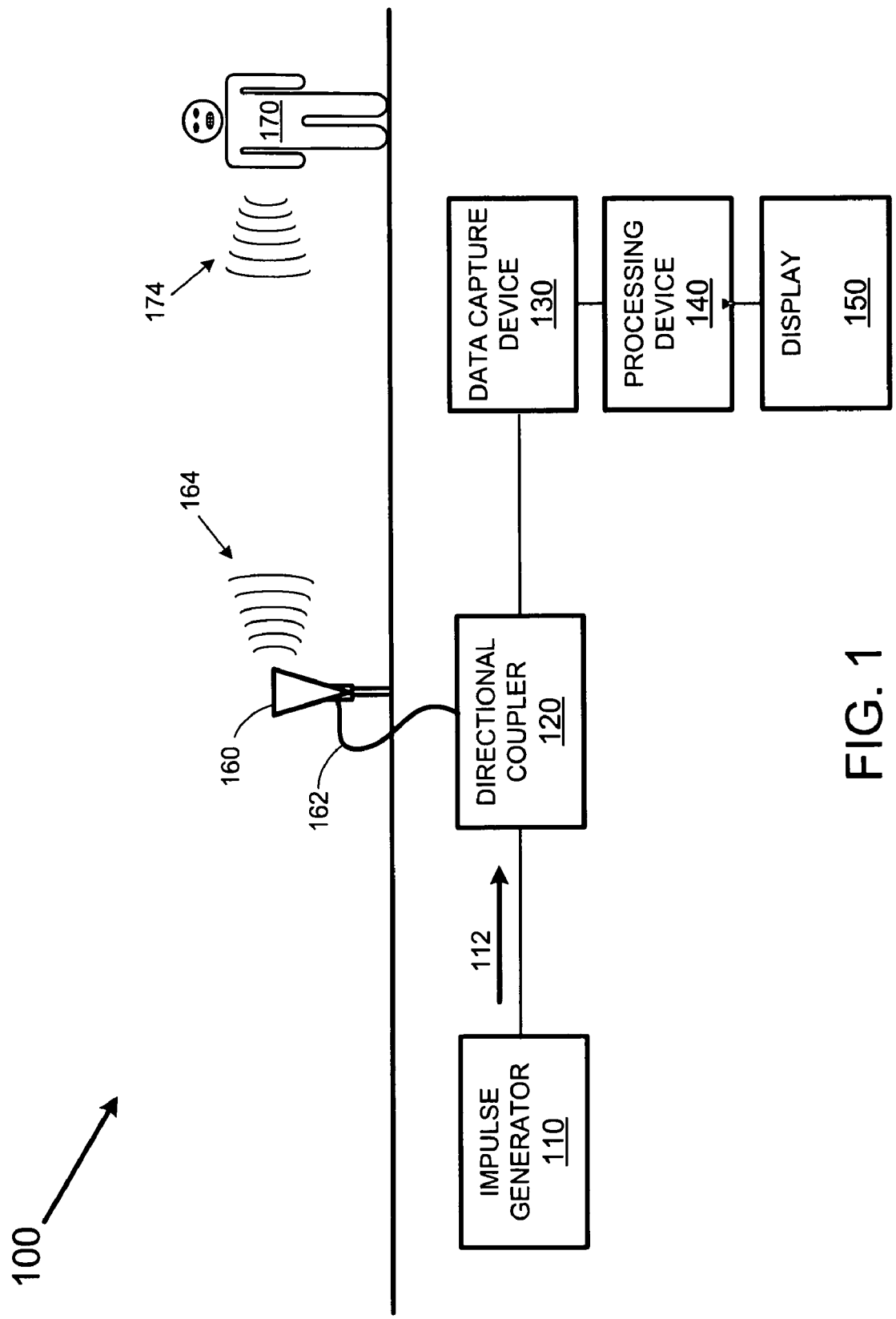
FIG. 1 is an exemplary detection system according to several embodiments of the present invention.

FIG. 1 depicts an exemplary metal detection system 100 usable to determine whether a person 170 (or other organism, such as a trained animal, for instance) is carrying an appreciable amount of metal, e.g., a handgun, components of a bomb, and so on. As shown in FIG. 1, the exemplary detection system 100 includes an antenna 160 coupled to both an impulse generator 110 and data capture device 130 via a directional coupler 120 and cable 162, as well as to a processing device 140 and a display 150 through data capture device 130.

In operation, the impulse generator 110 can emit an impulse signal 112, which can be fed to the antenna 160 via coupler 120 and cable 162. In turn, the antenna can emit a first detection signal 164 towards person 170.

Note that by placing the person 170 in front of the antenna 160 and hitting person 170 with the first detection signal 164, a scattering response signal 174 may be generated and provided back to the antenna 160.

Note that the ungrounded human body (with and without wearable metallic objects) can act as a parasitic antenna, and re-radiate energy with its natural or modified resonant response (due to worn metal). As the human body tends to resonate at about 75 MHz, it can be advantageous to fashion impulse generator 110 so to produce impulses having large amounts of spectral energy in the VHF (30 MHz-300 MHz) spectra. Similarly, it may be beneficial for antenna 160 to be generally optimized for use in the VHF spectra, as well as have appreciable directional capabilities so as to minimize off-target emission and reception so as to increase signal-to-noise ratio (SNR) and/or the signal-to-interference-plus-noise ratio (SI NR) of response signal 174.

Returning to FIG. 1, the scattered response signal 174 from person 170 can be captured by antenna 160, and routed to the data capture device 130 via cable 162 and directional coupler 120.

In turn, the captured response signal 170 may be subjected to a variety of processing techniques, such as a Fast Fourier Transform (FFT) signal analysis, to produce a frequency domain "picture" for later resonant frequency identification using any number of known or later developed techniques. One such non-limiting technique is discussed below.

First, a background time waveform measurement may be conducted of an area of interest, such as the entrance of a building, without any targets, e.g., person 170 or other human body, to produce a "background template."

Next, a time waveform measurement may be conducted with a human body in the area of interest, and when subtracted from the background template can yield a "human body response" template. Such templates, which can be derived using a variety of human bodies carrying no metal, can represent "safe" templates, while templates derived using metal-carrying human bodies can represent "suspect" templates. Or, the templates can be converted to frequency domain templates using FFT's. Both types of templates can be stored in a database within processing device 140 for later comparison to persons under observation.

Additionally, time waveform measurements may be conducted with a human body that is known to be carrying metal objects in the area of interest, and when subtracted from the aforementioned human body response template, results in a threat template. Either time domain or frequency domain responses could be stored, as mentioned above. It should be appreciated that because the relative position of worn metallic objects on person 170 relative to antenna 160 may mask the presence of such metallic objects, different templates that are based on different positioning of metal objects relative to the body may be employed. Alternatively (or additionally), multiple independent detection systems positioned at different angles to target human bodies may be employed.

In actual practice, an exemplary detection system similar to system 100 was tested by the inventors of the present disclosure to observe ungrounded human body resonant frequencies for a test subject (with and without metal) at distances of 50 feet, 70 feet, 100 feet and 120 feet between an antenna and a human subject. Accordingly, background templates, safe templates and suspect templates were fashioned using captured information.

Figure 2:
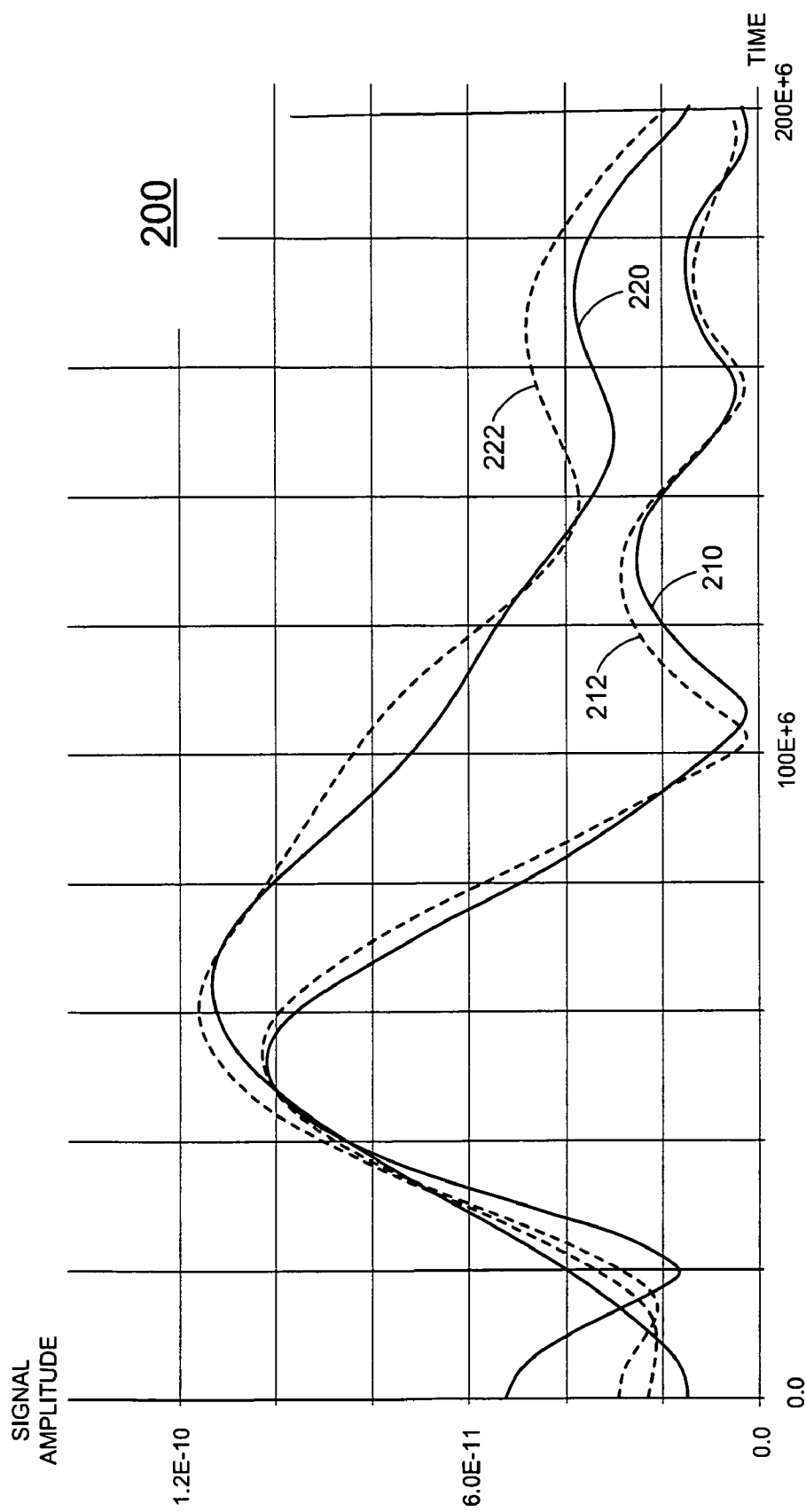
FIG. 2 is a graph that depicts a variety of response signal information for a human subject without metal in comparison with the same human subject carrying metal for ranges of fifty feet and seventy feet; and, FIG. 3 is a flowchart outlining an exemplary process for practicing the invention shown in FIG. 1, according to several embodiments of the present invention.

FIG. 2 is a frequency-domain graph 200 containing the above-mentioned templates for a human test subject for fifty feet without metal 210, fifty feet with metal 212, seventy feet without metal 220, and seventy feet with metal 222. As can be seen by FIG. 2, that absence or presence of metal on a human body can produce distinctive and appreciable changes in the frequency response of a template. Such templates may thus be used as a cornerstone of a remote body-worn metal detection system.

Note that, given that response signal 174 may vary depending on relative distance between the antenna 160 and person 170, it may be useful to derive range information using the relative timing between the detection signal 164 and the response signal 174, or by supplementary equipment, such as laser-based or sonic-based range finders, which could also yield information as to whether the person is approaching the antenna or not. Such range information can be used to determine the appropriate template(s) with which to compare a particular response signal noting that, in various embodiments, it may be useful to form amalgam templates, e.g., interpolated templates derived from two or more sampled templates, to provide comparison data to a given response signal. Other information, such as SNR and SINR, as well as various other secondary considerations, such as weather conditions, e.g., rain, may also be used by processing device 140 to determine whether person 170 is carrying metal.

Upon the appropriate processing by processing device 140, some form of likelihood indicator may be provided to display 150 so as to inform an operator as to the likelihood of metal being worn by person 170.

Figure 3:
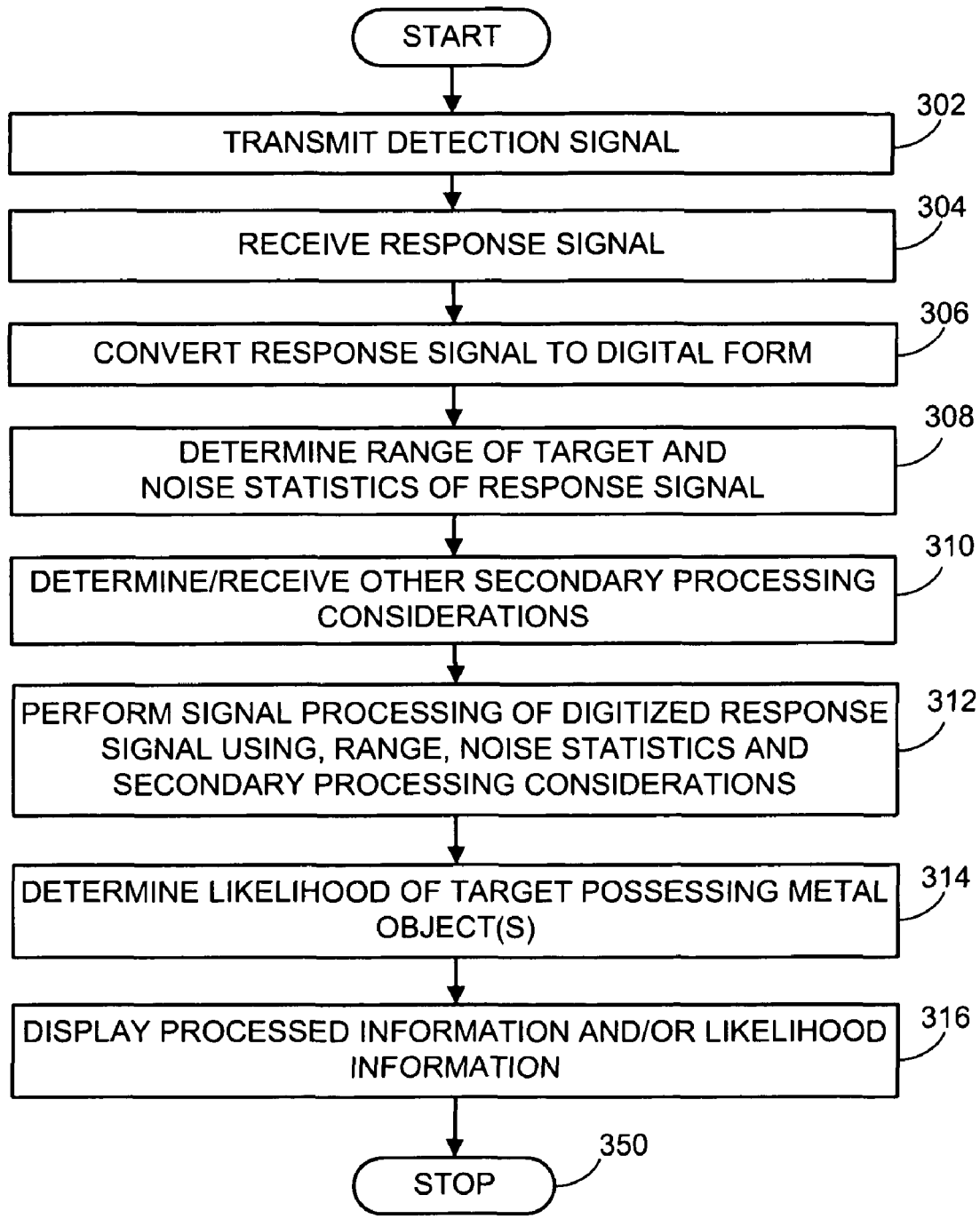

FIG. 3 is a flowchart outlining an exemplary process for remote worn metal detection of a human body (or other person). The process starts in step 302 where a detection signal, presumably derived from some form of impulse generator or other equipment, is transmitted from an antenna to a target human body. Again, as mentioned above, it may be beneficial to fashion the detection signal and antenna to work efficiently within the VHF frequency range, as well as fashion the antenna to have an appreciable degree of directionality. Control continues to step 304.

In step 304, a response signal generated/provided by the target human body (in response to interaction with the detection signal), may be received by the antenna (or optionally a second antenna), and, in step 306, the received response signal may be converted to digital form. Next, in step 308, target range and noise statistics may be determined. Then, in step 310, various secondary processing considerations, e.g., weather conditions, may be determined/received. Control continues to step 312.

In step 312, the digitized response signals may be processed using and or all of range information, noise statistics and secondary processing considerations. As discussed above, such processing my be used in the context of template matching, as well as any number of other recognizable approaches to those skilled in the art. Next, in step 314, a likelihood that the target human body has some form of closely coupled metal is determined. Then, in step 316, such likelihood information, as well as any other relevant processing information, may be displayed to an operator for appropriate action. Control then continues to step 350 where the process stops.

In various embodiments where the above-described systems and/or methods are implemented by processing device 140 using a programmable device, such as a computer-based system or programmable logic, it should be appreciated that the above-described systems and methods can be implemented using any of various known or later developed programming languages, such as "C", "C++", "FORTRAN", "Pascal", "VHDL" and the like.

Accordingly, various storage media, such as magnetic computer disks, optical disks, electronic memories and the like, can be prepared that can contain information that can direct a processing device 140, which can be a computer, to implement the above-described systems and/or methods. Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to communications.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus for remotely detecting metal objects carried by a person, comprising:
    an antenna;
    an signal generator coupled to the antenna operable to cause the antenna to emit an electromagnetic signal at a human body self-resonant frequency in the VHF range;
    a data capture device operable to capture response signal energy received by the antenna, the response signal energy being provided from the person in response to the first electromagnetic signal; and
    processing circuitry operable to determine whether the response signal energy has a change in signal characteristics due to mutual impedance phenomena between the object and the human body that occurs when the person is carrying a metal object, to determine whether or not the person is carrying an appreciable amount of metal.

2. The apparatus of claim 1, wherein the signal characteristics is signal to noise information from said response signal energy.

3. The apparatus of claim 1, wherein the processing circuitry determines whether or not the person is carrying an appreciable amount of metal by comparing the response signal to template information of a person that is not carrying metal.

4. An apparatus for remotely detecting metal objects carried by a person, comprising:
    an antenna;
    means for capturing response signal energy received by the antenna, the response signal energy being provided from the person at a human body self-resonant frequency in the VHF range, and in response to a first electromagnetic signal in the VHF range making contact with the person at the same said human body self-resonant frequency in the VHF range; and,
    processing means for determining whether the response signal energy has a change in signal characteristics due to mutual impedance phenomena between the object and the body that occurs when the person is carrying a metal object, to determine whether or not the person is carrying an appreciable amount of metal.

5. The apparatus of claim 4, wherein the signal characteristic is signal to noise information of the response signal.

6. The apparatus of claim 4, wherein the processing means determines whether or not the person is carrying an appreciable amount of metal by comparing the response signal to template information of a person that is not carrying the metal object.

7. A method for remotely detecting metal objects carried by a person, said method comprising the steps of:
    A) capturing response signal energy received with an antenna, the response signal energy being provided from the person at a human body self-resonant frequency in the VHF spectrum and in response to a first electromagnetic signal making contact with the person; and
    B) determining whether a change in signal characteristics due to mutual impedance phenomena at the self-resonant frequency in the VHF range between the object and the human body, which occurs when the person is carrying a metal object, exists in the response signal energy.

8. The method of claim 7, further comprising the step of:
    C) emitting the first electromagnetic signal to the person at said human resonant frequency.

9. The method of claim 7, wherein said step B) is accomplished by also using signal to noise information signal characteristic of the response signal.

10. The method of claim 9, wherein said step B) is accomplished by comparing the response signal to template information of persons not carrying metal.

* * * * *